(12) United States Patent
    Bertolino

(10) Patent No.: US 6,208,589 B1
(45) Date of Patent: Mar. 27, 2001

(54) METHOD OF SCREENING ACOUSTIC SIGNALS TRANSMITTED BY A MOVING TARGET

(75) Inventor: Charles Bertolino, Six-Fours (FR)

(73) Assignee: Delegation Generale pour l'armement, Armees (FR)

( * ) Notice: Subject to any disclaimer, the term of this patent is extended or adjusted under 35 U.S.C. 154(b) by 0 days.

(21) Appl. No.: 09/283,643

(22) Filed: Apr. 1, 1999

(30) Foreign Application Priority Data

Apr. 1, 1998 (FR) .................................................. 98 04042

(51) Int. Cl.$^7$ ...................................................... H04B 1/06
(52) U.S. Cl. .............................................................. 367/135
(58) Field of Search .................... 367/135, 129, 367/124, 118, 6, 3

(56) References Cited

U.S. PATENT DOCUMENTS

| | | | |
|---|---|---|---|
| 5,175,710 | * 12/1992 | Hustson | 367/135 |
| 5,216,640 | * 6/1993 | Donald et al. | 367/124 |
| 5,481,505 | * 1/1996 | Donald et al. | 367/124 |

* cited by examiner

*Primary Examiner*—Daniel T. Pihulic
(74) *Attorney, Agent, or Firm*—Oliff & Berridge, PLC

(57) ABSTRACT

The invention relates to a method of screening an acoustic signal or a spectrum line of maximum energy transmitted by a "target" that can be submerged at sea, from among a multitude of acoustic signals coming from any noise generators radiating acoustic signals of the same type with higher energy than energy E, employing, for example, (1) a set of N submersible acoustic pickups identically parameterized in surveillance mode, designed to detect the presence of the signal or a desired spectrum line, with the set of N pickups defining any number of surveillance cells with two adjacent pickups, each pickup being associated with one or more target detection regions defined as the geographic areas within which the presence of the "target" is deemed detectable and outside which the "target" is deemed nondetectable, and (2) a maximum number Nmax of pickups relating to one or more "special" areas (selected from a set of elementary geographic areas) of a given surveillance cell able simultaneously to detect the "target", wherein acoustic signal or line is detected by a number Nd of acoustic pickups in the set of N pickups and analyzed by a series of steps, principally: defining the conditions under which the noise generator is located and determining it relative to the special areas.

17 Claims, 8 Drawing Sheets

METHOD OF SCREENING ACOUSTIC SIGNALS TRANSMITTED BY A MOVING TARGET

BACKGROUND OF THE INVENTION

1. Field of Invention

The invention relates to a method for screening acoustic signals transmitted by a moving target, which can be submerged, and which will be designated by the name "target," by eliminating spurious acoustic signals radiated in particular by marine surface vessels, and which impede detection of acoustic signals radiated by the "target."

2. Description of Related Art

The signals radiated by the "target" are generally detected by using a set of acoustic pickups located in the same horizontal plane and arranged in a line.

The presence of numerous spurious signals with higher energy than the energy of the "target" and due to intense shipping activity makes detection of signals from the "target" increasingly difficult and complicates the job of the operator in charge of detection.

SUMMARY OF THE INVENTION

The invention relates to significantly reducing the number of unwanted signals interfering with the observation of "useful" signals to be detected, in order to decrease the workload of the operator.

The invention relates to a method of screening an acoustic signal (S) or a spectrum line (F) of maximum energy E transmitted by a "target" that can be submerged at sea, from among a multitude of acoustic signals coming from any noise generators (W) radiating acoustic signals of the same type with higher energy than energy E, employing, for example:

- a set of N submersible acoustic pickups identically parameterized in surveillance mode, designed to detect the presence of the signal (S) or a desired spectrum line (F), with the set of N pickups defining any number of surveillance cells with two adjacent pickups, each pickup being associated with one or more target detection regions defined as the geographic areas within which the presence of the "target" is deemed detectable and outside which the "target" is deemed nondetectable;
- a system for locating the pickups;
- a set of elementary geographic areas determined by the intersection of all the target detection regions of the N pickups, each elementary geographic area being defined as a geographic area within which any noise generator is always detectable by the same acoustic pickups;
- a set of "special" areas selected from all the above elementary geographic areas, each "special" area relative to a given surveillance cell being defined as an elementary geographic area within which the "target" may be detectable by at least one of the acoustic pickups of the surveillance cell;
- a maximum number Nmax of pickups relating to one or more "special" areas of a given surveillance cell able simultaneously to detect the "target", wherein the acoustic signal (S) or line (F) is detected by a number Nd of acoustic pickups from the set of N pickups, and analyzed by the following series of three consecutive steps:

1) If the number Nd of pickups detecting signal (S) or line (F) is greater than the number Nmax, the signal (S) or line (F) is eliminated, otherwise, the signal (S) or line (F) is retained for locating the noise generator (W) radiating signal (S) or line (F);

2) Definition of the conditions under which noise generator (W) is located; if these conditions are present, the noise generator is located by step 3 below; otherwise the signal (S) or line (F) is retained;

3) Locating noise generator (W) and determining relative to the "special" areas:

whether noise generator (W) is geographically inside one of the "special" areas, in which case signal (S) or line (F) is retained; otherwise signal (S) or line (F) is eliminated.

The method applies to all fields using passive listening acoustic buoys, fixed or movable lengthwise lines composed of hydrophones or hydrophone arrays, etc. as well as all types of known acoustic signals (spectrum lines, narrow bands, broad bands, transient signals, etc.).

The method according to the invention requires the following two conditions to be met: prior knowledge of the "target" detection region for each of N acoustic pickups in the set as a function of the type of acoustic signal processed and on-going knowledge of the geographic position of the N acoustic pickups in the set.

The principle of the method, applied to a set of submersible acoustic pickups, consists of determining the geographic areas within which any noise generator radiating an acoustic signal will be declared a possible target.

In the first case, the signal detected is retained as such, and subjected to the observation of the operator in charge of detection. In the second case, the signal is eliminated and not subjected to the observation of the operator.

When it is necessary to locate the noise generator, the first step of the method can be eliminated.

The invention is applied to reducing the number of false alarms generated by high-energy acoustic signals radiated by noise generators at the surface of the sea.

BRIEF DESCRIPTION OF THE DRAWINGS

Other characteristics and advantages of the present invention will emerge from reading the following description of the preferred embodiments, provided as not being limited as illustrated in the following figures, of which.

DETAILED DESCRIPTION OF PREFERRED EMBODIMENTS

Figure 1:
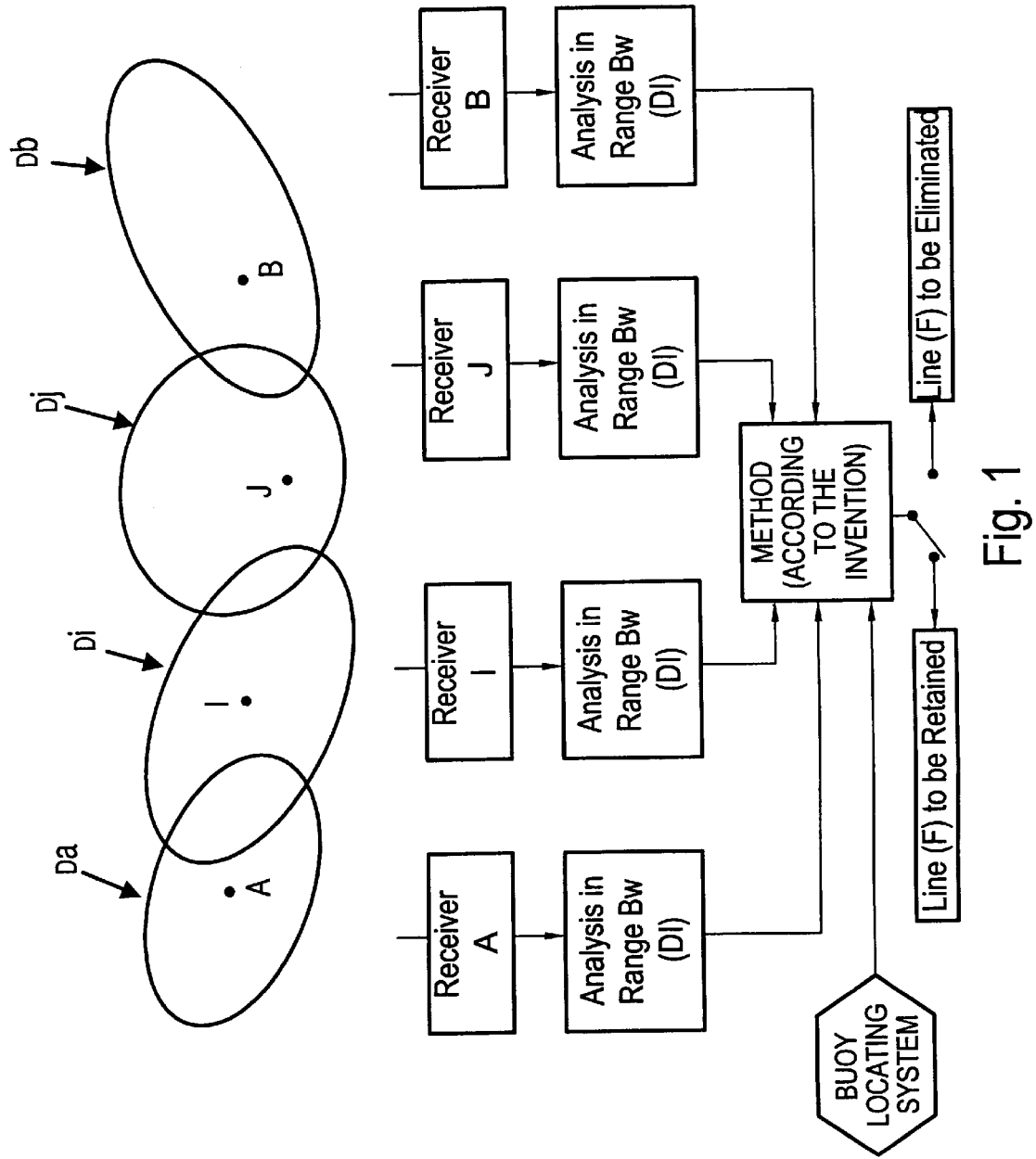
FIG. 1 represents a set of N passive listening acoustic buoys (A, I, J, B) with N=4.

In the example shown in FIG. 1, the acoustic signals from each buoy are transmitted via VHF to a receiving facility which then forwards them to an analysis system.

The type of analysis proposed, as a nonlimiting example, is to make a spectral analysis of the signals received by each of the N buoys in a frequency range Bw (with resolution Df) the results of which are made available to the method.

The method is continuously aware of the positions of the N buoys of the set because of an associated buoy locating system.

According to the rules of the art in the field, it is possible to geographically locate an acoustic noise generator as soon as an acoustic signal transmitted by the noise generator is detected by at least n buoys of the set of buoys at sea, with n=3 for the omnidirectional buoys, and n=2 for the other types of buoys (Difar, BARRA, etc.), and the N buoys in the set are themselves located by a buoy locating system (GPS, Gonio VHF, etc.).

Aside from the necessary detection of the acoustic signal by n buoys, the classical rules require, for reasons of accuracy, that the signal/noise (S/N) ratio over the n buoys is greater than a minimum value left to the discretion of the individual skilled in the art.

To simply the description, without restricting the generality of the method, it will be assumed that the minimum S/N ratio required is 0 dB (threshold of detection of the acoustic signal).

Thus, the only condition required for proceeding to locate a noise generator is detection by at least n buoys of the acoustic signal sent out by the noise generator.

All the buoys, with the exception of the omnidirectional type for which the concept of orientation is unnecessary, are provided with a compass so that the orientation of a reference axis specific to the buoy relative to magnetic north is known at all times.

The main types of signals (S) that come under consideration are: spectrum lines, narrow bands, broad bands, and transients.

Each type of buoy is also associated with a target detection region which can be defined a the geographic area within which the presence of the "target" is deemed detectable and outside which the "target" is deemed nondetectable (by the type of buoy concerned).

The target detection region of each type of buoy for an acoustic signal (S) with maximum energy E transmitted by the "target" is determined by estimating the maximum detection range of the type of buoy concerned, which takes into account the following parameters among others:

type of acoustic signal (S) to be processed, characteristics of the type of buoy concerned, environmental conditions, characteristics of the target to be detected, particularly the maximum radiated energy E, uncertainties relative to influential parameters, realistic "safety margin" protecting from random events.

From the above definitions, it may be considered that the boundary of a target definition region relative to a buoy X is the geographic location where a "target" radiating a given type of acoustic signal (S) with maximum energy E brings about a S/N ratio at buoy X that is equal to the detection threshold (0 dB, in the general case).

Thus, for a given buoy X and from knowledge of the target definition region of the type X buoy, from the orientation of the axis of reference specific to buoy X, and from the geographic position of buoy X, it is possible to delimit the geographic location of the target definition region relative to buoy X in any system of geographic axes.

In the case of several potential "targets" to be detected and likely to emit the same type of acoustic signal (S) but with different energies (E) specific to each of the potential "targets" such as for example: target A (Ea), target B (Eb) . . . , target Q (Eq) involving the existence of particular respective target definition regions Da, Db, . . . , Dq, it is possible, for a given type of buoy, to determine the unique majorant target definition region resulting from the joining of all the specific target definition regions (Da, Db, . . . , Dq) relative to the type of acoustic signal (S).

Coming back to the case of a single "target" to be tracked, FIG. 1 shows the delimitation of the N (four in number) target definition regions of buoys A, I, J, and B designated respectively by Da, Di, Dj, and Db. It will be assumed that each of the N buoys in the set has only one target definition region for a given type of acoustic signal (S).

According to usage, in view of the shallow depth of the acoustic pickups of the N buoys in the set relative to the distance from the noise generators (including the "target"), the target definition region for a given type of buoy can be equated with a plane surface contained in the horizontal plane of the acoustic pickups.

The principle of the method according to the invention can be applied to all types of passive buoys and all types of acoustic signals (S) encountered (spectrum lines, narrow bands, broad bands, transients, etc.) provided the following two conditions are met: all the target definition regions of the N buoys in the set and known and the geographic positions of the N buoys in the set are continuously known.

Assuming that the two above conditions are met, the method can then determine the so-called special geographic areas defined below.

Next, over time and according to the number of buoys detecting the acoustic signal emitted by the noise generator and/or the position of the noise generator radiating the acoustic signal, the method according to the invention is able to decide whether the noise generator can be a "target", in which case the acoustic signal detected is preserved as such and subjected to the observation of the operator.

If the noise generator cannot be a "target", the acoustic signal detected is then eliminated and not subjected to the observation of the operator.

To illustrate the operation of the method, based on the diagram of FIG. 1, one assumes that the acoustic signal in question is a spectrum line (F), analyzed in a surveillance range (Bw, Df) for each of the N buoys in the set.

Figure 2:
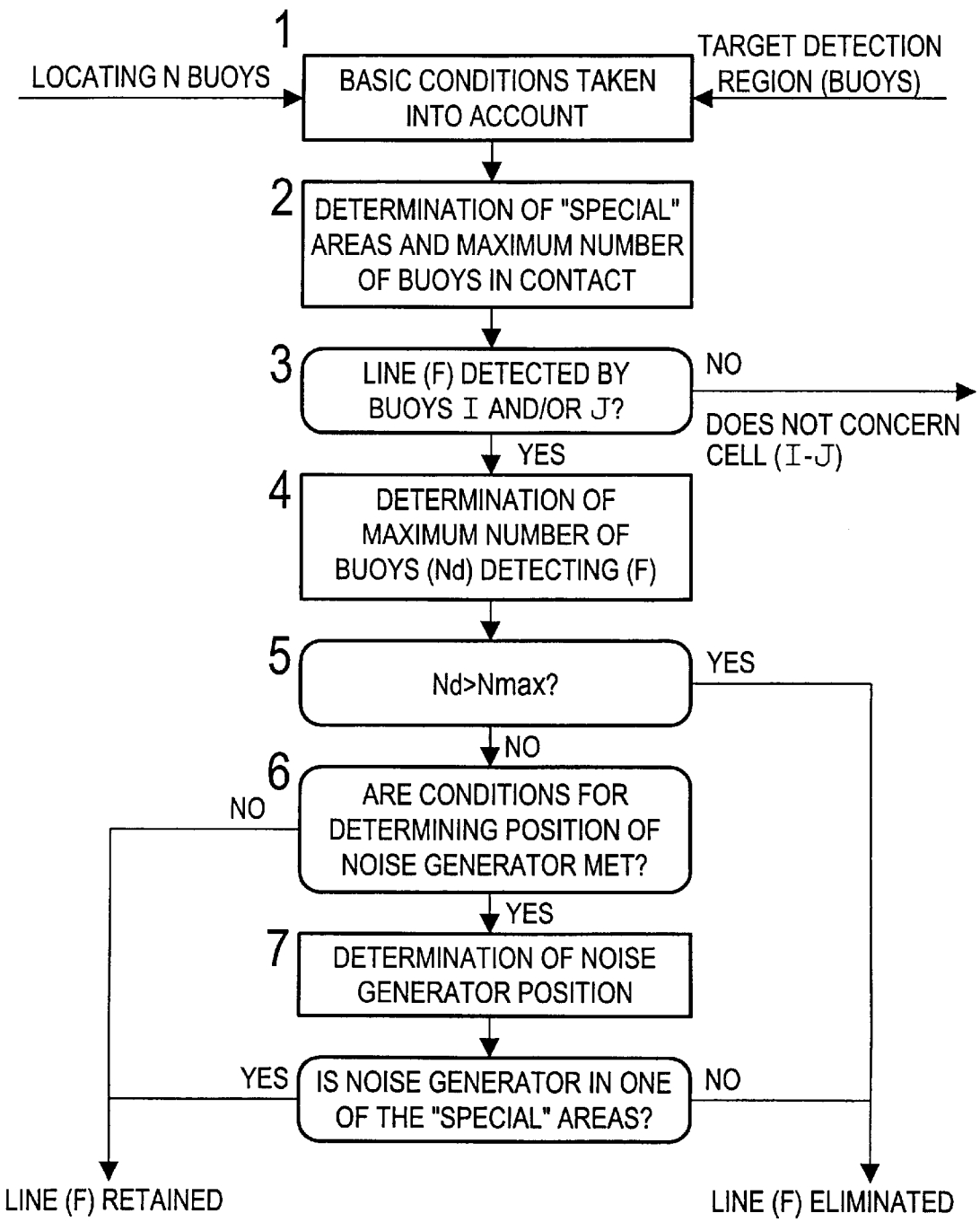
FIG. 2 shows the implementation of the method schematically.
Figure 3:
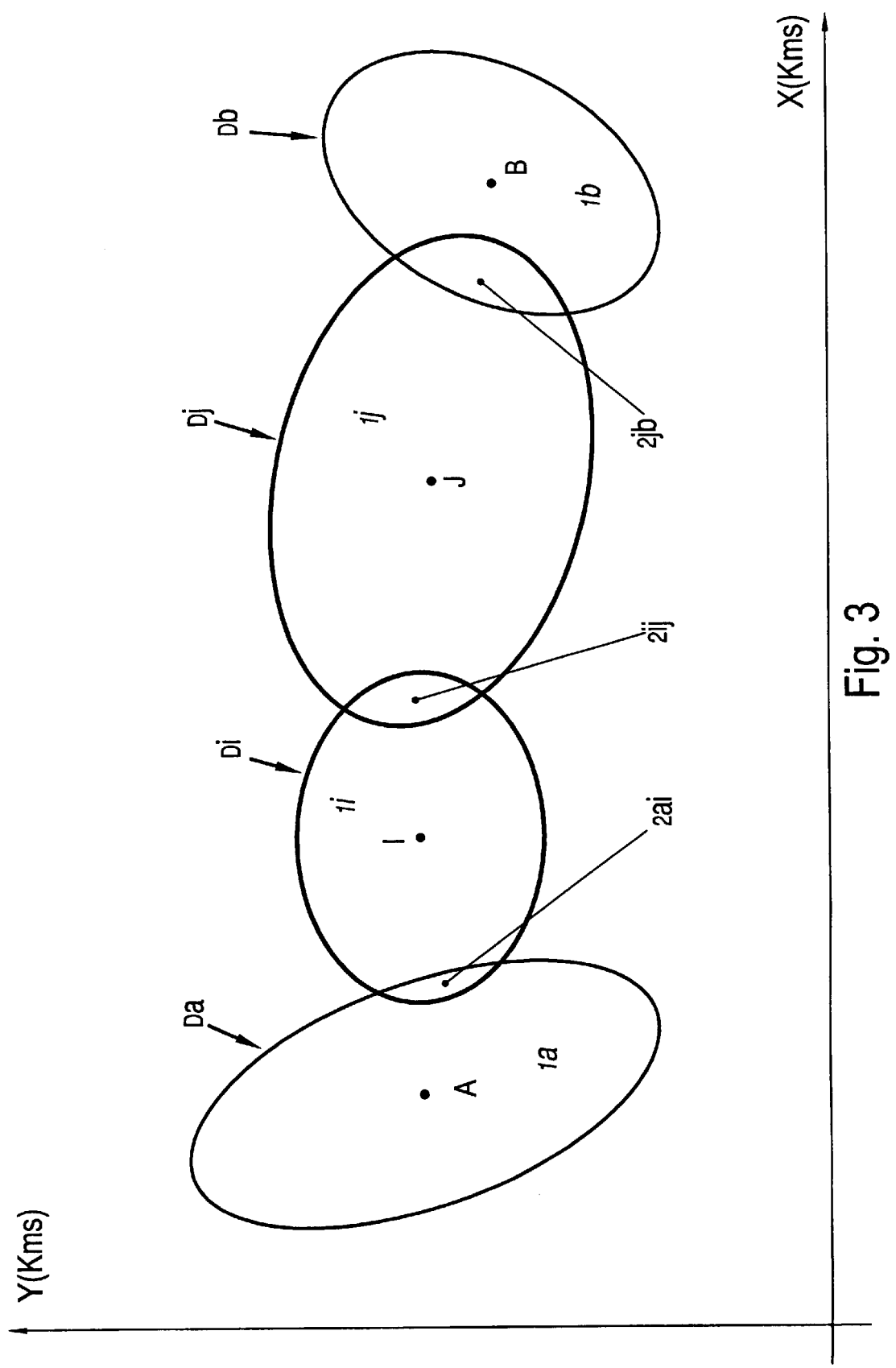
FIG. 3 represents the target detection regions of the N buoys.

We assume, according to current practice, that line (F) is always identifiable despite its "dopplerization" due to movement of the moving target radiating it;

We also assume, as is customary in surveillance mode, that all the N surveillance ranges (Bw, Df) processing the acoustic signals of the N buoys, are parameterized in a strictly identical manner (band Bw, resolution Df, center frequency F0, integration constant, etc);

We also take as a basis the method application diagram shown in FIG. 2 whose rules will be applied to a any set of buoys such as that shown in FIG. 3.

If we consider the representation of the target definition regions (for N=4 buoys A, I, J, B) according to FIG. 3, we find there are four different types of buoy and thus target definition regions of different shapes and sizes. The four corresponding target definition regions whose respective boundaries Da, Di, Dj, Db are shown in FIG. 3, determine the elementary geographic areas designated as follows:

Area 1a: Area where the "target" is detectable by 1 buoy: buoy A

Area 1i: Area where the "target" is detectable by 1 buoy: buoy I

Area 1j: Area where the "target" is detectable by 1 buoy: buoy J

Area 2ai: Area where the "target" is detectable by 2 buoys: buoys A and I

Area 2ij: Area where the "target" is detectable by 2 buoys: buoys I and J

Area 2jb: Area where the "target" is detectable by 2 buoys: buoys J and B

An elementary geographic area is defined as a geographic area within which any noise generator, in this case the "target", is always detectable by the same buoy or buoys whatever the position of the noise generator within the area.

It may also be considered that any set of N buoys can always be broken down into a set of elementary surveillance cells, each elementary surveillance cell being itself composed of 2 neighboring buoys.

The number of elementary surveillance cells in a set of N buoys is variable and depends essentially on the geographic distribution of the buoys.

In the general case, as shown in FIG. 3, usage requires that (N=1) adjacent surveillance cells be determined.

According to this usage, we thus have the particular case of FIG. 3, with the following three elementary cells:

surveillance cell (A-I)
surveillance cell (I-J)
surveillance cell (J-B)

Considering surveillance cell (I-J) as the basic cell, we can step by step extend the principle of the method, applied to cell (I-J), to the other elementary surveillance cells.

Focusing only on cell (I-J), we can see that the joining of the two target definition regions (Di and Dj, drawn with thick lines in FIG. 3) is in some sense a sanctuary in which the "target" is detectable by buoy (I) and/or by buoy (J).

Since, for the example considered, we are concerned only with cell (I-J), we can exclude from the previous geographic areas the areas 1a and 1b, as in these areas the "target" is detectable neither by buoy I nor by buoy J.

Hence, the five geographic areas of interest, hereinafter called "special areas" and identified in "*italic*" letters, are the following:

"Special" area 1 *i*
"Special" area 1 *j*
"Special" area 2 *ai*
"Special" area 2 *ij*
"Special" area 2 *jb*

A "special" area can be defined as an elementary geographic area in which the "target" is deemed to be detectable by at least one of the two buoys (I or J).

Observation of the "special" areas above enables us to deduce that the maximum number Nmax of buoys "in contact," i.e. buoys that can simultaneously detect the signal from the "target" in the "sanctuary" I-J, is equal to 2 (Nmax=2).

For purposes of explanation it will be assumed for example that any acoustic noise generator can be located by having at least n=2 buoys in the set detect the line (F) emitted by the noise generator.

The diagram in FIG. 2 shows all the steps of the proposed method, necessarily ending in retention or elimination of line (F), as follows:

Step 1: Taking account of the basic conditions: target definition regions of the N buoys of the set and geographic positions of the N buoys of the set.

Step 2: Determining the "special" areas and Nmax, memorizing the "special" parameters thus determined, and, over time, updating the "special" parameters.

Step 3: Verifying that line (F) is detected only by cell (I-J) (detection by I and/or J otherwise another surveillance cell concerned).

Step 4: Counting the number of buoys (Nd) detecting line (F) over the set of N buoys.

Step 5: If the number Nd of pickups detecting line (F) is greater than the number Nmax, line (F) is eliminated; otherwise, line (F) is retained for locating the noise generator (W) radiating it according to the following steps.

Step 6: Defining the conditions under which the noise generator is located.

If the noise generator locating conditions are met, the noise generator is located by step 7 below. Otherwise, line (F) is retained.

Step 7: Locating the noise generator and determining, relative to the special areas:

If the noise generator is in one of the "special" areas, the line (F) is retained because it may come from a target;

If the noise generator is outside any "special" area, line (F) is eliminated.

The method according to the invention deliberately assumes the case where efforts are made to minimize the computing work of locating the noise generator.

If, for various reasons, it is necessary to locate the noise generator systematically whenever possible, the first line elimination test in step 5 will not be necessary and one may proceed directly from step 4 to step 6.

To clarify the operation of the method, the detailed rules above will be applied to the diagram in FIG. 3, assuming for example that there is only one spurious noise generator (W) radiating a line (F) of energy (Wdb) greater than the energy (Edb) of the "target" at frequency (F).

Assume that Wdb=Edb+6 dB (approximately), which for example involves doubling the range of detection of noise generator W of each of the N buoys in the set.

It will now be considered that for any buoy X in the set, the new noise generator detection region (W) is deduced from the target definition region relative to buoy X by homothetic transformation of the ratio K=2 with the homothetic center being the geographic position of buoy X.

Figure 4:
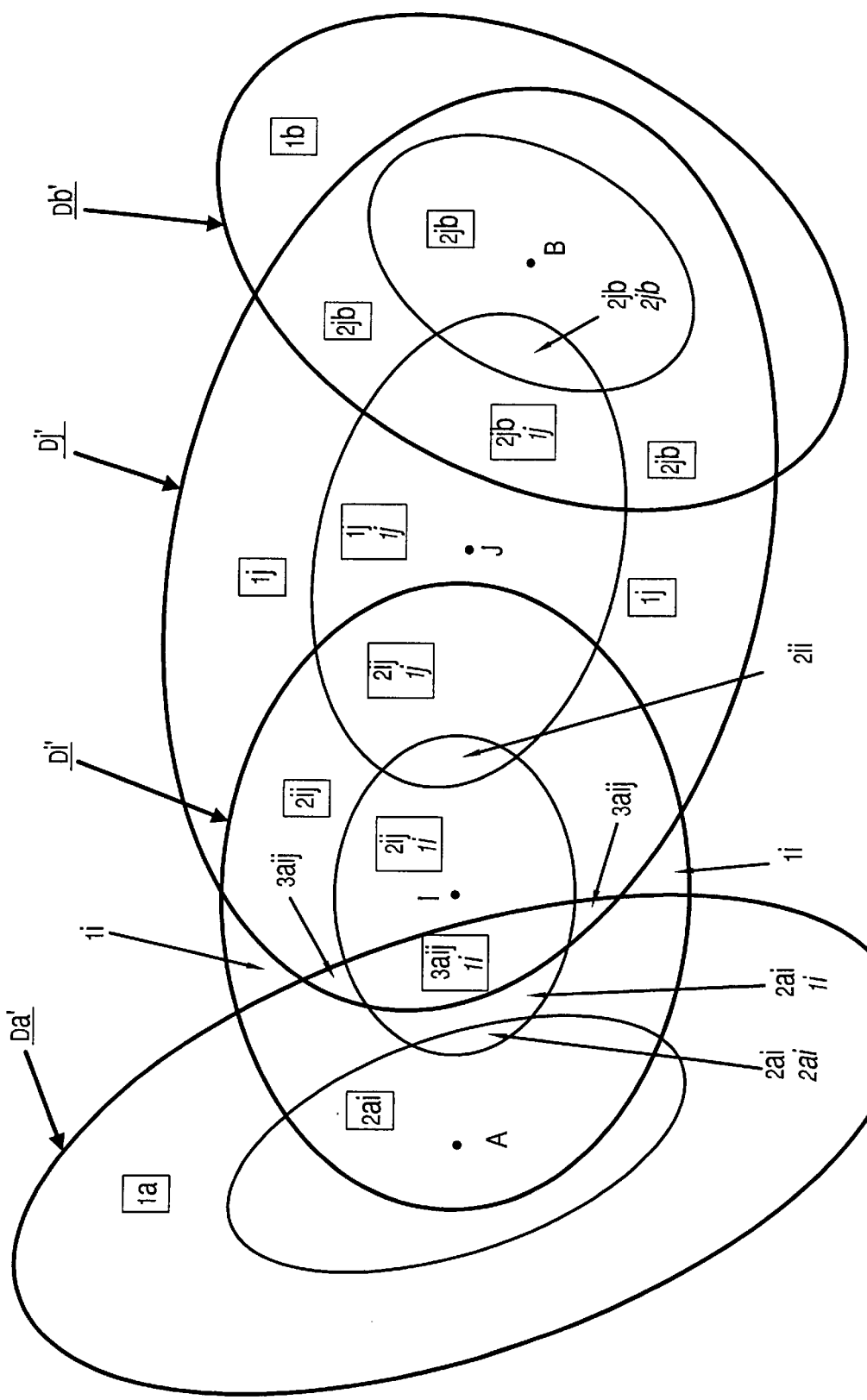
FIG. 4 represents the elementary geographic areas in which a spurious noise generator is detected.

FIG. 4 is a schematic representation of the new detection regions of a spurious noise generator (W) with energy Wdb approximately 6 dB greater than the energy Edb of the target. These regions are designated D'a, D'i, D'j, D'b, and obtained by homothetic transformation of the ratio K=2 from target definition regions Da, Di, Dj, Db, respectively, indicated in FIG. 3.

In FIG. 4, the new noise generator detection regions (W) have been drawn in thick lines and, for the record, the initial target definition regions from which the "special" parameters were determined and exploited by the method have been retained and drawn in thin lines.

The intersection of the new noise generator detection regions (W) such as D'a, D'i, D'j, and D'b determines the existence of new elementary geographic areas that will be designated analogously to their previous designations.

To facilitate understanding, the new areas are designated in Roman letters (e.g. 3aij) while the "special" areas continue to be in italics (e.g. 2*ij*).

Assuming that steps 1, 2, and 3 of the method have been accomplished, the remaining steps will now be tackled based on the diagram in FIG. 4.

It will be remembered, for the record, that the "special" parameters known and exploited by the method are the following: areas (2*ai*, 2*ij*, 2*jb*), areas (1*i*, 1*j*), Nmax=2.

Step 4 consists of counting the number of buoys (Nd) detecting line (F) over the set of the N buoys.

According to FIG. 4, there is/are:

1 area where Nd=3 (3aij)

3 areas where Nd=2 (2ai, 2ij, 2jb)

2 areas where Nd=1 (1i, 1j)

Step 5 consists of eliminating areas where Nd>Nmax.

From the details of the above areas, we see that if noise generator (W) is in area (3aij), line (F) will be eliminated (Nd=3>Nmax=2).

In step 6, the conditions for locating the noise generator are defined.

From the details of the above areas, we can deduce that:

if noise generator (W) is in one of the areas (1i or 1j), line (F) will be retained (locating impossible: Nd=1<n=2);

if noise generator (W) is in one of the areas (2ai, 2ij, 2jb), it is necessary to locate noise generator (W).

In the case not found in the arrangement of FIG. 4 where noise generator (W) is in an area "foreign" to the "special" areas (for example: area 2ab), line (F) is routinely eliminated (area not known by method).

Step 7 locates the noise generator.

According to the method of the invention, it may be deduced that:

if, for a given elementary geographic area, the designation of this area (in Roman letters) is identical to the designation of this same area (in italics), the area in question is part of the "special" areas and hence line (F) will be retained;

if not, the area in question is not part of the "special" areas so that line (F) will be eliminated.

Examination of FIG. 4 shows that the application of the method leads to line (F) being retained if noise generator (W) is in one of the following areas:

Area 2ai / 2ai "special" area

Area 2ij / 2ij "special" area

Area 2jb / 2jb "special" area

Area 1j / 1j "special" area (locating impossible)

Area 1j / 1j areas impossible to locate

With respect to the objective of reducing false alarms, it must be emphasized that since the spurious noise generator (W) is by definition a source of false alarms (FA), the fact:

of retaining line (F) means a false alarm is retained;

of eliminated line (F) means that a false alarm is eliminated.

Figure 5:
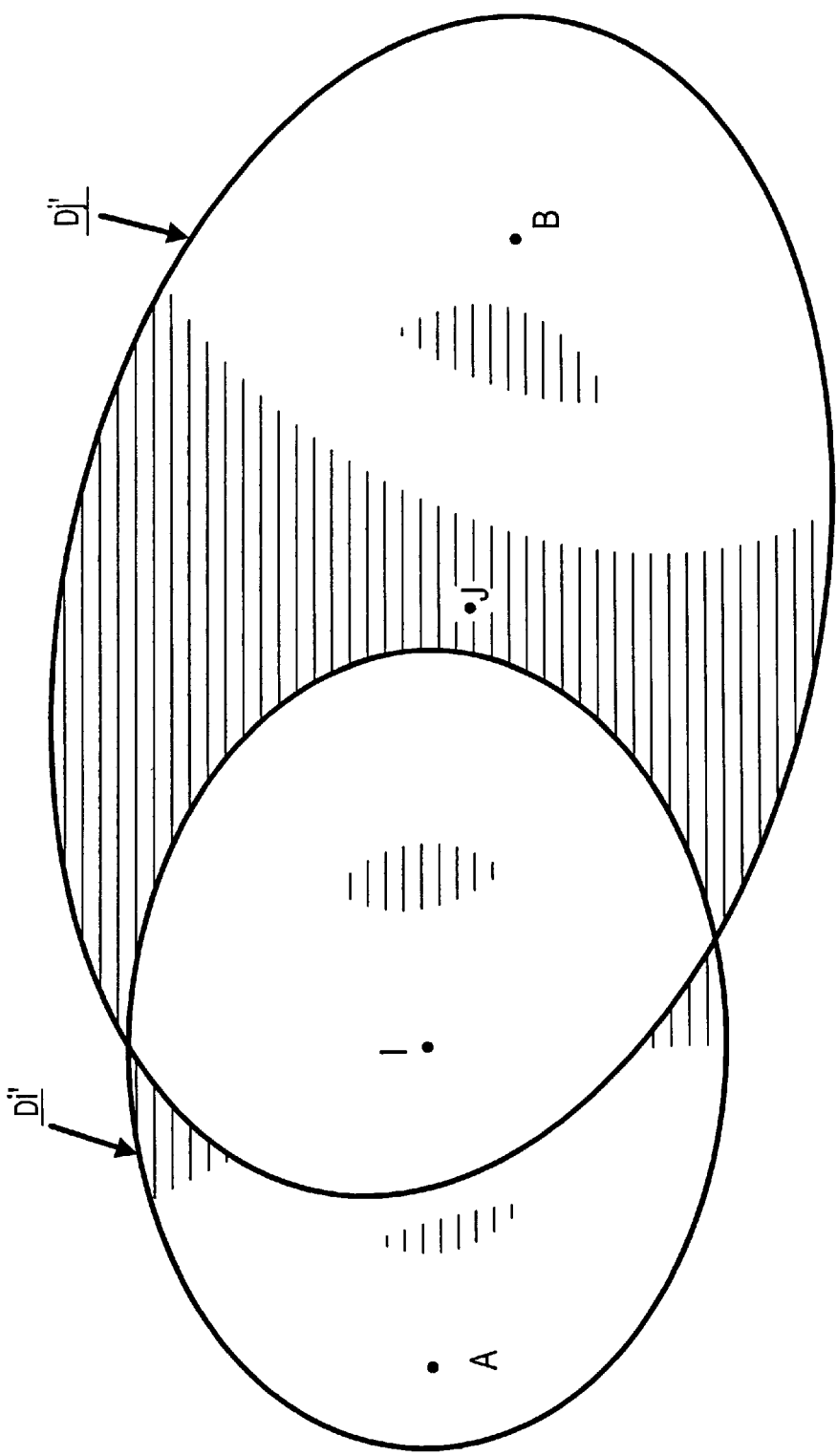
FIG. 5 represents the remaining area of false alarms when the method according to the invention is applied.

FIG. 5 shows the delimitation of the false alarm areas resulting from application of the method to the particular case of FIG. 4 and where the shaded false alarm areas correspond to the areas where line (F) is retained.

Assuming that spurious noise generator (W) can homogeneously and uniformly occupy the total overlap area of regions D'i and D'j and using the following designations:

St is the total surface area of the overlap of regions D'i and D'j;

Sfa is the sum of the surface areas of the false alarms (shaded areas in FIG. 5);

we can estimate the percent reduction in false alarms according to the following equation:

$$\% \text{ reduction } (FA) = (1 - Sfa/St) * 100$$

An evaluation of the surface areas of FIG. 5 gives an approximate estimate of 70% for the reduction in FA in the case in question (FIGS. 3, 4, 5).

It is predictable that if the energy of the spurious noise generator (W) (always greater than the maximum energy E of the "target") increases, the noise generator detection regions (W) will increase correlatively in a homothetic relationship substantially equal to:

$$K = 10^{\cdot}[(Wdb - Edb)/20]$$

which will tend to involve the presence of numerous elementary geographic areas that will cause a net increase:

either in the number of buoys (ND) detecting line (F), greater than Nmax;

or in areas "foreign" to the "special" areas;

or in identification areas conforming to the "special" areas but not geographically located in the positions of the "special" areas.

This situation will lead to a rapid fall-off in the false alarm rate and a rapid decrease in the percentage of the locating workload as a function of the increase in the energy (W) of the spurious noise generator.

In general, the shape and/or size of any target definition region (D) relative to a given type of acoustic pickup depend on the frequency of line (F).

In the frequent case where the type of acoustic signal (S) radiated by the "target" is composed of a certain number (Nx) of spectrum lines that one wishes to apply to the method in the surveillance mode, simultaneously, over Nf spectrum lines (with Nf<or=Nx), the variation in the target definition region (D) as a function of frequency (F) must be taken into account.

One practical means consists of determining the unique majorant target definition region D', considering the overall region resulting from the overlap of the Nf target definition regions (D, F), relative to the region (D) and the Nf spectrum lines selected.

The new majorant region D' thus defines the target definition region relative to the Nf spectrum lines to be monitored simultaneously.

We then apply the basic rules of the method to the set of N majorant target definition regions thus obtained.

Figure 6A:
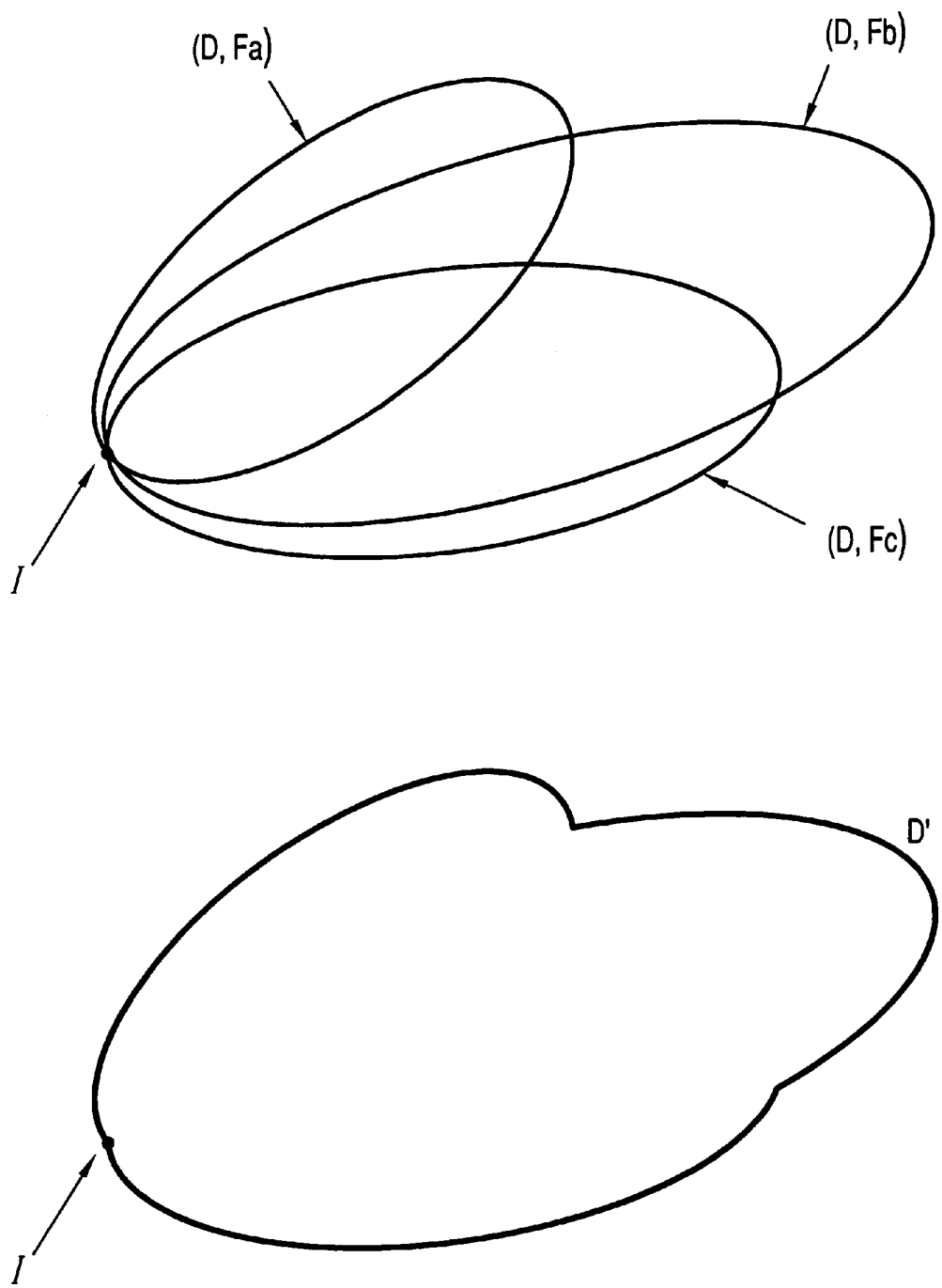
FIGS. 6a and 6b represent the principle of determination of majorant target detection regions.
Figure 6B:
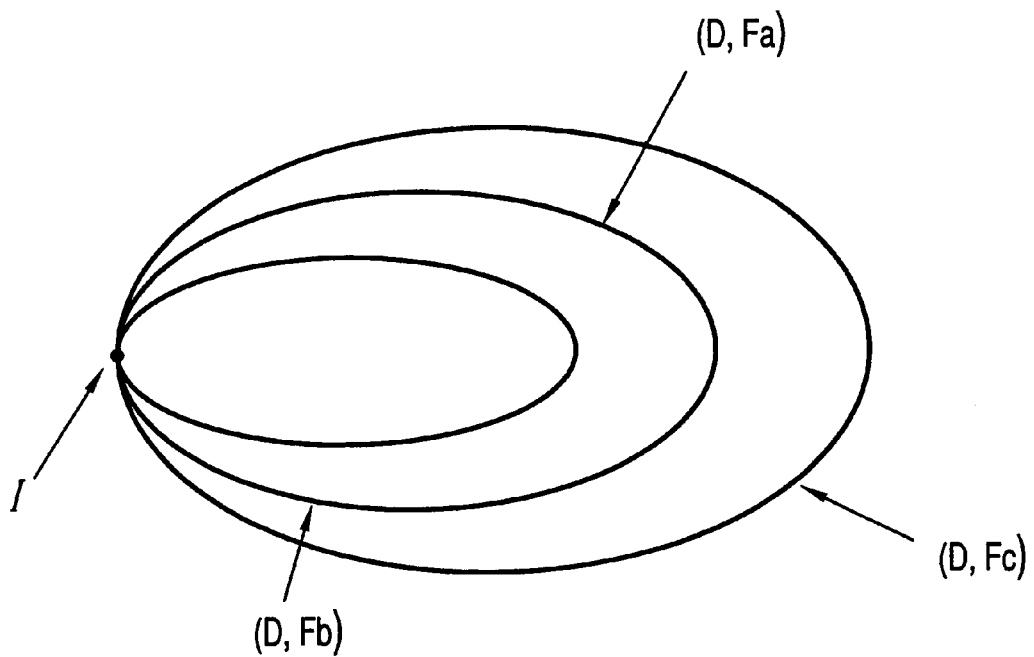
Figure 6B:
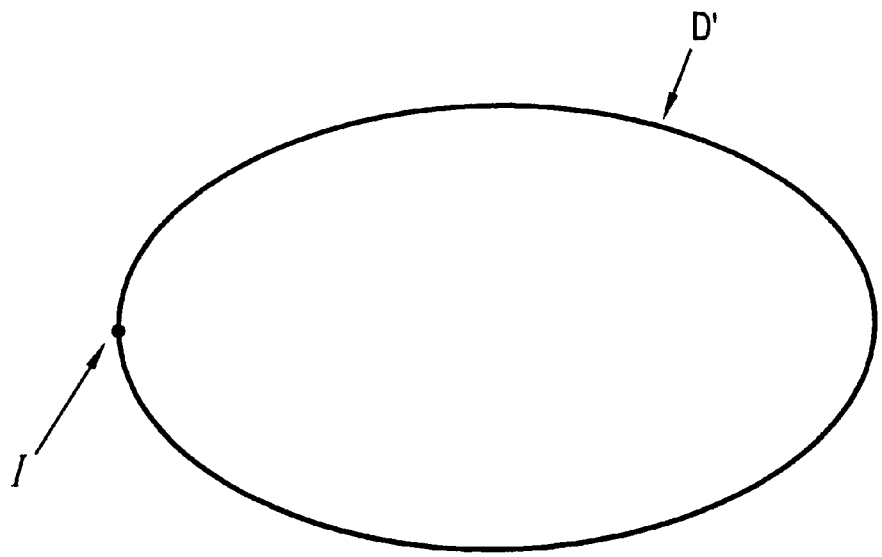

FIGS. 6a and 6b illustrate, for a pickup I, the principle of determining the majorant target definition region (D') relative to any target definition region (D) in the case where the acoustic signal (S) is made of Nf=3 spectrum lines (Fa, Fb, Fc) and where it is desirable to monitor all the Nf(=3) spectrum lines simultaneously.

Each spectrum line (Fa, Fb, Fc) respectively determines the particular target definition regions (D, F) such as:

Target detection region (D, Fa)

Target detection region (D, Fb)

Target detection region (D, Fc)

FIG. 6a represents the very frequent case where the majorant region D' obtained by the overlap of the three regions [(D, Fa), (D, Fb), (D, Fc)] is identical to one of the composite regions (e.g. D, Fc).

FIG. 6b represents the exceptional case where the majorant region D' obtained by the overlap of the three regions [(D, Fa), (D, Fb), (D, Fc)] is different from any one of the three composite regions.

In reality, most of the usually types of buoy have several target definition regions that will be designated "beams" or "channels."

These beams can be formed:

either from the intrinsic characteristics of the type of buoy concerned (e.g. cardioid "beams" of a Difar type buoy)

or from a group of acoustic pickups (e.g. "beams" of a BARRA type buoy or array of buoys).

In general, each beam may be considered to be a particular target definition region.

The "beams" of a given type of buoy have target definition regions that may be different or identical and have different angular orientations.

Figure 7:
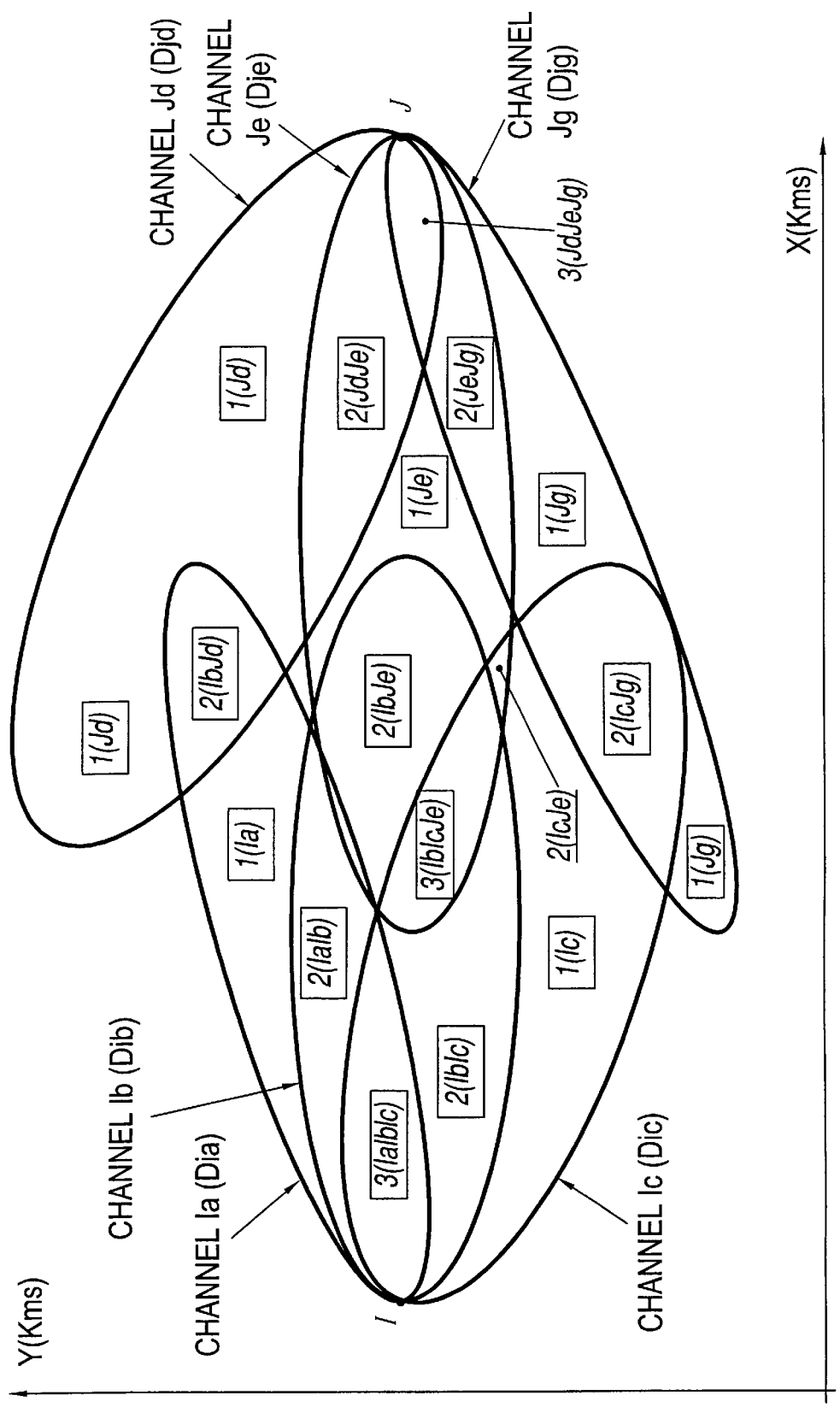
FIG. 7 represents the case of several target detection regions for two different types of buoys.

As an example, FIG. 7 shows the basic cell (I-J) made of two different types of buoy with several "beams."

Each of the buoys (I and J) are for example defined by three different beams, different target definition regions and different angular orientations.

According to the designation principle adopted, we can write according to FIG. 7:

| Buoy I | Beam Ia | of target detection region | Dia |
|---|---|---|---|
|  | Beam Ib | of target detection region | Dib |
|  | Beam Ic | of target detection region | Dic |
| Buoy J | Beam Jd | of target detection region | Djd |
|  | Beam Je | of target detection region | Dje |
|  | Beam Jg | of target detection region | Djg |

According to the basic rules of the method, the intersection of the target definition regions of different beams creates "special areas" the overlap of which is the target detection "sanctuary" of cell (I-J).

As an indication, the delimitation of the corresponding "special" areas may be noted (FIG. 7);

three areas (with three intersection beams)

3 (I a I b I c) "target" detectable, at a time, by Beams Ia, Ib, Ic 3 (I b I c J e) "target" detectable, at a time, by Beams Ib, Ic, Je 3 (J d J e J g) "target" detectable, at a time, by Beams Jd, Je, Jg eight areas (with two intersection beams)

2 (I a I b) "target" detectable, at a time, by Beams Ia, Ib 2 (I b I c) "target" detectable, at a time, by Beams Ib, Ic 2 (I b J e) "target" detectable, at a time, by Beams Ib, Je 2 (I c J e) "target" detectable, at a time, by Beams Ic, Je 2 (I c J g) "target" detectable, at a time, by Beams Ic, Jg 2 (I b J d) "target" detectable, at a time, by Beams Ib, Jd 2 (J e J g) "target" detectable, at a time, by Beams Je, Jg 2 (J d J e) "target" detectable, at a time, by Beams Jd, Je five areas (with one beam)

1 (I a) "target" detectable, only, by Beam Ia 1 (I c) "target" detectable, only, by Beam Ic 1 (J g) "target" detectable, only, by Beam Jg 1 (J d) "target" detectable, only, by Beam Jd 1 (J e) "target" detectable, only, by Beam Je Depending on the determination of the above "special" areas, we may deduce that Nmax=3.

Initializing steps 1 and 2 of the method with the new "special" parameters determined above, and taking into account the positions of buoys I and J, we can then allow the normal operation of the method to proceed according to the above description.

As an nonlimiting example, assume there are Q "targets" able to emit the same type of acoustic signal (S), composed, for each of the Q "targets," of a set of Zq different spectrum lines with different respective energies (Eq) and designated as follows:

Target A defined by Zam lines with respective energies: Ea1, Ea2, ... Eam;

Target B defined by Zbk lines with respective energies: Eb1, Eb2 ... Ebk; and

Target Q defined by Zqp lines with respective energies: Eq1, Eq2 ... Eqp.

Let Nz be the total number of lines to be monitored simultaneously, with Nz=Zam+Zbk+ ... +Zqp. Thus there are Nz particular target definition regions relative to any "beam" V of one buoy X in the set.

According to the principle described above, it is possible to obtain the unique majorant target definition region relative to "beam" V of buoy X, by the overlap of Nz particular target definition regions defined above.

In general, one can readily see that the principle of the method, applied to the basic cell (I-J), can be extended step by step to all the other surveillance cells in the set.

Identically, the principle of the method, applied to line (F) of the surveillance range (Bw, Df) can, in the first instance, be extended to all the lines detected in surveillance range (Bw, Df) and, secondarily, be extended to all the lines detected in the other surveillance ranges, if any.

The method according to the invention can benefit from classical implementation methods of the prior art such as, for example:

locating a noise generator (W) from buoys detecting line (F) with the maximum S/N ratio (improvement in locating accuracy);

merging data such as, for example, possibility of extension, elimination of line (F) in all the surveillance ranges detecting line (F), in the event that the line has been previously eliminated by the method in any range (Bw, Df);

correlation of the acoustic locating of a noise generator (W) with the surface situation (radar for example) to remove doubts as to the identification of a noise generator (surface vessels or not);

by an associative property, elimination of all types of signals (S) the geographic position of whose emission source coincides with the geographic position of the noise generator (W) radiating line (F) and declared a "non-target" following application of the method according to the invention.

Since differential drift of the buoys is a slow phenomenon (several meters/minute) with a low update frequency for the "special" areas, since the computing load is small (high percentage of FA elimination without localization calculation), since elimination of a line (F) in any range (Bw, Df) may cause this line (F) to be eliminated without calculation, over all the surveillance ranges concerned, we may deduce that the computing power dedicated to implementing the method should be very marginal by comparison to the computing power of classical acoustic detection equipment.

It may also be noted that application of the method according to the invention is based only on considering acoustic signals, which gives it total autonomy; in particular, knowledge of the geographic location of surface shipping, while useful, is not essential.

In conclusion, application of the method according to the invention enables the false alarm rate to be very significantly reduced, relieves the operator of any manual intervention by fully automating the operations, and allows ready adaptation to the various configurations of buoy sets in the surveillance mode.

In any event, application of the method very significantly simplifies problems involved in processing false alarms and has a highly variable impact on the cost of building detection equipment using acoustic buoys.

In addition, since the method may be applied to any type of listening acoustic pickup and any type of acoustic signal provided the required conditions are met, its application to any fixed or moving passive listening device, operated by processing present or future signals, may be envisaged.

The method according to the invention can also be transposed to the area of airborne acoustic detection.

What is claimed is:

1. A method of screening an acoustic signal of maximum energy transmitted by a seagoing target, from among a multitude of acoustic signals coming from any noise generators radiating acoustic signals of with higher energy than the target's maximum energy, the method comprising:

detecting the presence of acoustic signals using a set of submersible acoustic pickups identically parameterized in a surveillance mode, with the set of N pickups defining any number of surveillance cells with two adjacent pickups, each pickup being associated with one or more target detection regions defined as the geographic areas within which the presence of the target is deemed detectable and outside which the target is deemed non-detectable;

locating the pickups;

determining a set of elementary geographic areas using the intersection of all the target detection regions of the N pickups, each elementary geographic area being defined as a geographic area within which any noise generator is always detectable by the same acoustic pickups; and selecting a set of special areas from all the elementary geographic areas, each special area relative to a given surveillance cell being defined as an elementary geographic area within which the target may be detectable by at least one of the acoustic pickups of the surveillance cell;

wherein a maximum number Nmax of pickups relating to one or more special areas of a given surveillance cell are able to simultaneously detect the target, and an acoustic signal is detected by a subset of acoustic pickups Nd from the set of N pickups, such that if the subset Nd of pickups detecting the acoustic signal is greater than Nmax, the acoustic signal or spectrum line is eliminated, otherwise, the acoustic signal is retained for locating a noise generator that is radiating the acoustic signal.

2. The method of claim 1, wherein the target is submerged.

3. The method of claim 1, wherein the acoustic signal corresponds to a spectrum line.

4. The method of claim 1, further comprising:

determining whether the noise generator can be located, and if so locating the noise generator and determining relative to the special areas, whether the noise generator is geographically inside one of the special areas in which case the acoustic signal is retained, otherwise the acoustic signal is eliminated.

5. The method of claim 4, wherein in determining whether the noise generator can be located, if it is determined that the noise generator cannot be located, the acoustic signal is retained.

6. The method of claim 5, wherein the target is submerged.

7. The method of claim 5, wherein the acoustic signal corresponds to a spectrum line.

8. A method of screening an acoustic signal or corresponding spectrum line of maximum energy transmitted by a target that can be submerged at sea, from among a multitude of acoustic signals coming from any noise generators radiating acoustic signals of with higher energy than the energy from the target's acoustic signals, comprising:

taking account of the basic conditions, including target detection regions of a set of N buoys and geographic positions of the N buoys of the set;

determining special areas, the special areas being elementary geographic areas in which the target may be detectable by at least one pickup of a given surveillance cell;

determining Nmax, Nmax being the maximum number of pickups simultaneous able to detect the target;

verifying that the spectrum line is detected only by Nmax;

determining the number of buoys (Nd) detecting the spectrum line over the set of N buoys;

analyzing the detected spectrum line by defining the conditions under which the noise generator is located, such that if the noise generator locating conditions are met, the noise generator is located, otherwise the spectrum line is retained; and locating the noise generator relative to the special areas, wherein if the noise generator is in one of the special areas, the spectrum line is retained as possibly originating from the target, however, if the noise generator is determined to be outside any special area, the spectrum line is eliminated.

9. The method of claim 8, wherein the special areas and Nmax parameters are stored and updated over time.

10. The method of claim 8, wherein the target is submerged.

11. A system that screens an acoustic signal of maximum energy transmitted by a seagoing target, from among a multitude of acoustic signals coming from any noise generators radiating acoustic signals of with higher energy than the target's maximum energy, the system comprising:

a set of submersible acoustic pickups identically parameterized in a surveillance mode, that detects the presence of acoustic signals with the set of N pickups defining any number of surveillance cells with two adjacent pickups, each pickup being associated with one or more target detection regions defined as the geographic areas within which the presence of the target is deemed detectable and outside which the target is deemed non-detectable;

a pickup locating unit to locate the pickups;

an elementary geographic area determining unit that determines a set of elementary geographic areas using the intersection of all the target detection regions of the N pickups, each elementary geographic area being defined as a geographic area within which any noise generator is always detectable by the same acoustic pickups; and a special area selection unit that selects a set of special areas from all the elementary geographic areas, each special area relative to a given surveillance cell being defined as an elementary geographic area within which the target may be detectable by at least one of the acoustic pickups of the surveillance cell;

wherein a maximum number Nmax of pickups relating to one or more special areas of a given surveillance cell are able to simultaneously detect the target, and an acoustic signal is detected by a subset of acoustic pickups Nd from the set of N pickups, such that if the subset Nd of pickups detecting the acoustic signal is greater than Nmax, the acoustic signal or spectrum line is eliminated, otherwise, the acoustic signal is retained for locating a noise generator that is radiating the acoustic signal.

12. The system of claim 11, wherein the target is submerged.

13. The system of claim 11, wherein the acoustic signal corresponds to a spectrum line.

14. The system of claim 11, further comprising:

a noise generator locating unit that determines whether the noise generator can be located, and if so, locates the noise generator and determines relative to the special areas, whether the noise generator is geographically inside one of the special areas in which case the acoustic signal is retained, otherwise the acoustic signal is eliminated.

15. The system of claim 14, wherein if the noise generator locating unit determines that the noise generator cannot be located, the acoustic signal is retained.

16. The system of claim 15, wherein the target is submerged.

17. The system of claim 15, wherein the acoustic signal corresponds to a spectrum line.

* * * * *